(12) United States Patent
Birumachi

(10) Patent No.: US 6,631,082 B2
(45) Date of Patent: Oct. 7, 2003

(54) SWITCHING POWER SUPPLY UNIT

(75) Inventor: Takashi Birumachi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/961,694

(22) Filed: Sep. 24, 2001

(65) Prior Publication Data

US 2002/0075700 A1 Jun. 20, 2002

(30) Foreign Application Priority Data

Sep. 25, 2000 (JP) ........................................ 2000-291167

(51) Int. Cl.[7] ................................................ H02M 3/24
(52) U.S. Cl. ...................................... 363/97; 363/21.03
(58) Field of Search ........................... 363/21.02, 21.08, 363/21.04, 24, 25, 26, 97, 124, 133, 134, 15, 16, 21.03

(56) References Cited

U.S. PATENT DOCUMENTS

| 4,686,615 A | * | 8/1987 | Ferguson | 363/17 |
| 5,434,768 A | * | 7/1995 | Jitaru et al. | 363/21.01 |
| 5,929,665 A | * | 7/1999 | Ichikawa et al. | 327/109 |
| 5,973,939 A | * | 10/1999 | Tan | 363/97 |
| 6,381,160 B1 | * | 4/2002 | Sauerlander et al. | 363/124 |
| 6,400,581 B1 | * | 6/2002 | Lee | 363/21.01 |

* cited by examiner

Primary Examiner—Adolf D. Berhane
Assistant Examiner—Gary L. Laxton

(57) ABSTRACT

A switching power supply unit is capable of performing zero-voltage switching in the entire load region to reduce switching loss and noise and improve the voltage transmission efficiency. The switching power supply unit has a main switching device, and an auxiliary switching device for controlling resonance so as to prevent power loss accompanying a switching action of the main switching device. A control circuit varies the OFF period, during which the main switching device and the auxiliary switching device are OFF simultaneously, according to power consumption by a load on an apparatus in which the switching power supply unit is installed.

3 Claims, 14 Drawing Sheets

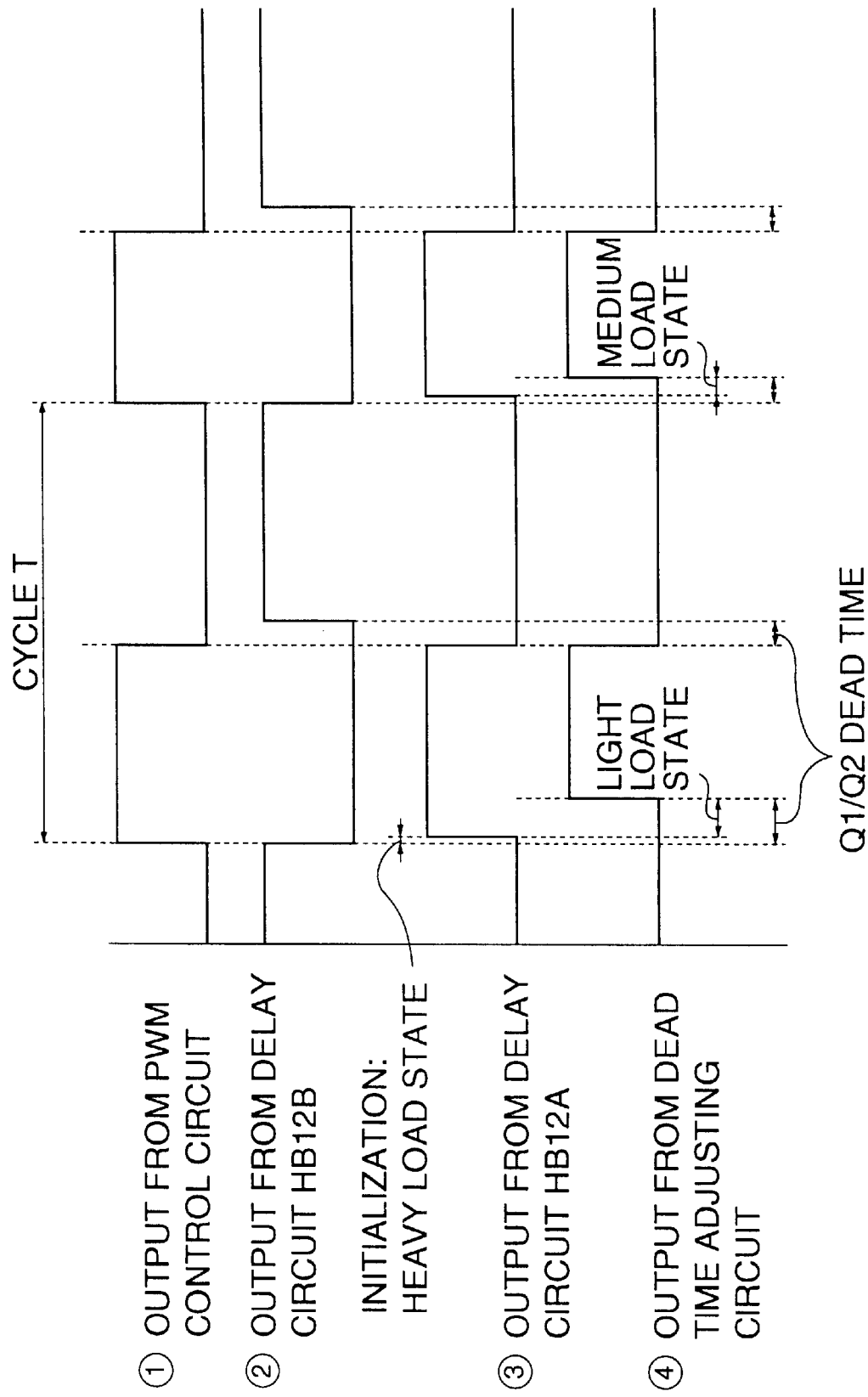

□ Vg1   ◇ Vg2

□ IQ1   ◇ ILS1   ▽ ILP   △ ICON

□ IDS1   ◇ IDS3   ▽ IL0   △ IDS2

□ IQ1   ◇ VQ1   ▽ IQ2   △ ID2   ○ IC1

TIME

THIS PERIOD IS ELIMINATED BY DEAD TIME ADJUSTING CIRCUIT ACCORDING TO PRESENT INVENTION

□ Vg1    ◇ Vg2

□ IQ1   ◇ ILS1   ▽ ILP   △ ICON

□ IDS1   ◇ IDS3   ▽ IL0   △ IDS2

□ IQ1   ◇ VQ1   ▽ IQ2   △ ID2   ○ IC1

TIME t0<t<t1 t1<t<t2 t2<t<t3

UNOPERATING IN LIGHT LOAD STATE t6<t<t7 t7<t<t8 t8<t<t9 t9<t<t10 t10<t<t11 t11<t<t12

SWITCHING POWER SUPPLY UNIT

BACKGROUND OF THE INVENTION

1. Field of the Invention

This invention relates to a switching power supply unit such as a DC-DC converter, and more particularly to a switching power supply unit that is capable of reducing noise and energy loss.

2. Description of Related Art

As a conventional power supply, a switching regulator is widely used which is constructed such that a switching device serially-connected to a transformer is turned on/off to convert a direct-current voltage into an alternating-current voltage, which is then applied to a primary winding of the transformer to cause a secondary winding thereof to generate an alternating-current voltage stepped down according to a turn ratio thereof, and the alternating-current voltage is rectified and smoothed to obtain a direct-current voltage.

A one-chip type forward converter as shown in FIG. 12 is known as an example of the switching regulator.

The one-chip type forward converter shown in FIG. 12 is constructed such that direct-current voltage Vin obtained by rectifying and smoothing a commercial alternating-current power supply input by a rectifier circuit, not shown, is applied to a serial circuit that is comprised of an insulating transformer T and a semiconductor switching device Q1.

A reset circuit that is comprised of a diode D1, a capacitor C1 and a resistance R1 is connected to both ends of a primary winding N1 of the insulating transformer T.

A pair of a rectifier diode Ds1 and a flywheel diode Ds2 is connected to a secondary winding N2 of the insulating transformer T. The respective cathodes of the diodes Ds1 and Ds2 are connected to each other and are connected to the positive end of a smoothing capacitor C2 via a choke coil Lo. The negative end of the capacitor C2 is connected to an anode of the diode Ds2 and the positive end of the secondary winding N2. These circuits constitute a secondary rectifier/smoothing circuit.

There will now be outlined the operations of the forward converter in FIG. 12.

The semiconductor switching device Q1 is turned on/off in synchronism with a drive signal. This drive signal is generated by a conventional PWM control circuit (not shown) that controls the ON/OFF period ratio of the semiconductor switching device Q1 while monitoring a direct-current output voltage from the converter so that the direct-current output voltage becomes equal to a desired constant voltage.

Under the control of the PWM control circuit, the semiconductor switching device Q1 is switched at a substantially higher frequency than that of a commercial alternating-current power supply (50 Hz or 60 Hz). This causes the direct-current input voltage Vin to be applied to the primary winding N1 of the insulating transformer T only while the semiconductor switching device Q1 is ON, and causes the secondary winding N2 of the insulating transformer T to generate an alternating-current voltage according to a turn ratio of the transformer T. The generated alternating-current voltage is rectified by the diodes Ds1 and Ds2, and smoothed by the choke coil Lo and the smoothing capacitor C2, and a direct-current output of a predetermined voltage is acquired between the terminals of the smoothing capacitors C2.

When the semiconductor switching device Q1 is turned off, excitation energy accumulated in the insulating transformer T during the ON period is converted into thermal energy and consumed by the resistance R1 in the reset circuit comprised of the diode D1, the capacitor C1 and the resistance R1, so that the excitation energy is reset. This enables absorption of a surge voltage.

In this case, the maximum duty of the PWM control circuit is set to be not greater than 50% in terms of the time required for resetting the excitation energy accumulated in the transformer T.

Thus, in the case of the forward converter, the insulating transformer T becomes saturated unless the excitation energy therein is reset.

The CRD circuit serving as a conventional reset circuit causes its resistance to consume the excitation energy, and this results in energy loss.

The switching power supply unit that acquires a direct-current output by interrupting a voltage by the switching device causes power loss since changes in current and voltage overlap with each other in the turn-on period and turn-off period of the switching device (see FIGS. 13A to 13D).

To eliminate such energy loss, a partial resonance type power supply has been proposed in which a capacitor is connected in parallel with a switching device, and when the switching device is turned off, a surge voltage is absorbed by resonance and a terminal voltage across the capacitor is gradually raised so as to reduce switching loss such as the above-mentioned energy loss and power loss, and then energy accumulated in the capacitor is regenerated to an input side.

In such a partial resonance type power supply, a capacitor Ccv is connected in parallel with a main switching device Q1 via an auxiliary switching device Q2, and the ON/OFF timing of the auxiliary switching device Q2 is shifted from that of the main switching device Q1 as shown in FIG. 3 such that excitation energy is once accumulated in the capacitor Ccv and then the excitation energy is regenerated to an input side, and also the main switching device Q1 is switched after the terminal voltage across the main switching device Q1 is lowered to zero.

The partial resonance type power supply has the following advantages, for example: (1) it can be controlled by PWM; (2) the zero-voltage switching enables a reduction in switching loss and noise; and (3) the regeneration of excitation energy reduces reactive power. In particular, the partial resonance type power supply controlled by PWM has the following advantages: (4) it is possible to use an inexpensive PWM control IC; and (5) it is easy to design the transformer and reduce noise since the driving frequency is fixed.

To reduce the loss in the regeneration of electric current in the partial resonance type power supply, a variety of methods have been proposed: e.g. an inductance is inserted in parallel with the secondary winding, or a tertiary winding is used.

With any of these methods, however, if a forward converter is used as the partial resonance type power supply, a rectifier diode and a flywheel diode are made to conduct at the same time for a long period of time in a rectifier diode section on the secondary side as shown in FIG. 14. Therefore, at the same input voltage, the power transmission efficiency is deteriorated compared with the conventional power supply unit although the loss is reduced.

If the conventional forward converter controlled by PWM is modified directly into a partial resonance type forward converter, since the maximum duty of the main switching device is not greater than 50% due to the reset period, if the load current is increased, regenerative current flowing to the input side during the OFF period is larger than current flowing during the ON period during which power is transmitted to the secondary side. This may cause excitation of the insulating transformer T in the negative direction (negative excitation).

Even if the restraint on the maximum duty can be released, since the timing of driving the auxiliary switching device is determined according to the time period that is required for discharging regenerative current in a light load state, in the case of a power supply unit installed in an apparatus such as a copying machine whose load fluctuates in a very wide range because most of the load is applied by a motor, in a heavy load state regenerative current during the OFF period is larger than the current flowing during the ON period during which power is transmitted to the secondary side as in the case where the maximum duty is restrained. This results in the negative excitation of the transformer T. Therefore, the resonance has to be made in a limited load range. Consequently, the effects of low loss and low noise obtained by zero-voltage switching cannot be achieved in a light load state.

The degraded power transmission efficiency and the negative excitation of the insulating transformer T are caused by the maximum duty being set to 50% or less in the case where the conventional PWM controlled forward converter circuit is used.

If excitation energy is regenerated to the input side, the value of regenerated current varies according to the load conditions. Thus, in a period (dead time) during which the main and auxiliary switching devices are OFF, the time required for completely discharging the capacitor storing excitation energy therein by resonance is likely to be long in a light load state and short in a heavy load state.

SUMMARY OF THE INVENTION

It is therefore an object of the present invention to provide a switching power supply unit that is capable of performing zero-voltage switching in the entire load region to reduce switching loss and noise and improve the voltage transmission efficiency.

To attain the above object, the present invention provides a switching power supply unit comprising a main switching device, an auxiliary switching device for controlling resonance so as to prevent power loss accompanying a switching action of the main switching device, and varying means for varying an OFF period during which both the main switching device and the auxiliary switching device are OFF, according to power consumption by a load.

Preferably, the varying means increases the OFF period as power consumption by the load is smaller and decreases the OFF period as the power consumption by the load is larger.

In a preferred embodiment of the present invention, there is provided a switching power supply unit of a PWM-controlled forward converter type comprising an input power supply, a transformer having a primary winding connected in series to the input power supply, a secondary winding, and a tertiary winding, a resonance inductor connected in series to the input power supply, main and auxiliary switching devices of a field effect type, a rectifier diode connected to the secondary winding, a flywheel diode connected to the secondary winding, an inductor connected to the secondary winding a first capacitor formed of a parasitic or independent capacitor connected in parallel between a drain and a source of the main switching device, a first diode connected in anti-parallel between the drain and source of the main switching device, a second capacitor connected in parallel with the main switching device via the auxiliary switching device, the second capacitor having a larger capacitance than the first capacitor, a third capacitor formed of a parasitic or independent capacitor connected in parallel between a drain and a source of the auxiliary switching device, a second diode connected in anti-parallel between the drain and source of the auxiliary switching device, a third diode connected to the tertiary winding, a PWM control circuit that generates a first control signal for turning on/off the main switching device, and a second control signal for turning on/off the auxiliary switching device so as to give a predetermined dead time to an ON-OFF period of the first control signal, and a control circuit that varies timing of the second control signal according to a power consumption level of a load on an apparatus in which the switching power supply unit is installed, and the tertiary winding has one end thereof connected to the secondary winding such that the tertiary winding is identical in magnetic polarity with the secondary winding, and the tertiary winding has another end thereof connected to the third diode such that excitation energy accumulated in the transformer is outputted to a positive pole of an output side of the switching power supply unit while allowing adjustment of regenerated current at an input side of the switching power supply unit when the main switching device is turned off.

Typically, the apparatus in which the switching power supply unit is installed is a copying machine.

According to the arrangement of the present invention, the switching power supply unit having a partial resonance function using the resonance control auxiliary switching device provides the optimum dead time control according to the power consumption by the load. This improves the power supply efficiency.

The above and other objects, features, and advantages of the invention will become more apparent from the following detailed description taken in conjunction with the accompanying drawings.

BRIEF DESCRIPTION OF THE DRAWINGS

FIG. 3 is a timing chart showing drive signals from the control circuit HB1 in FIG. 2;

DETAILED DESCRIPTION OF THE PREFERRED EMBODIMENTS

The present invention will now be described in detail with reference to the accompanying drawings showing a preferred embodiment thereof.

Figure 1:
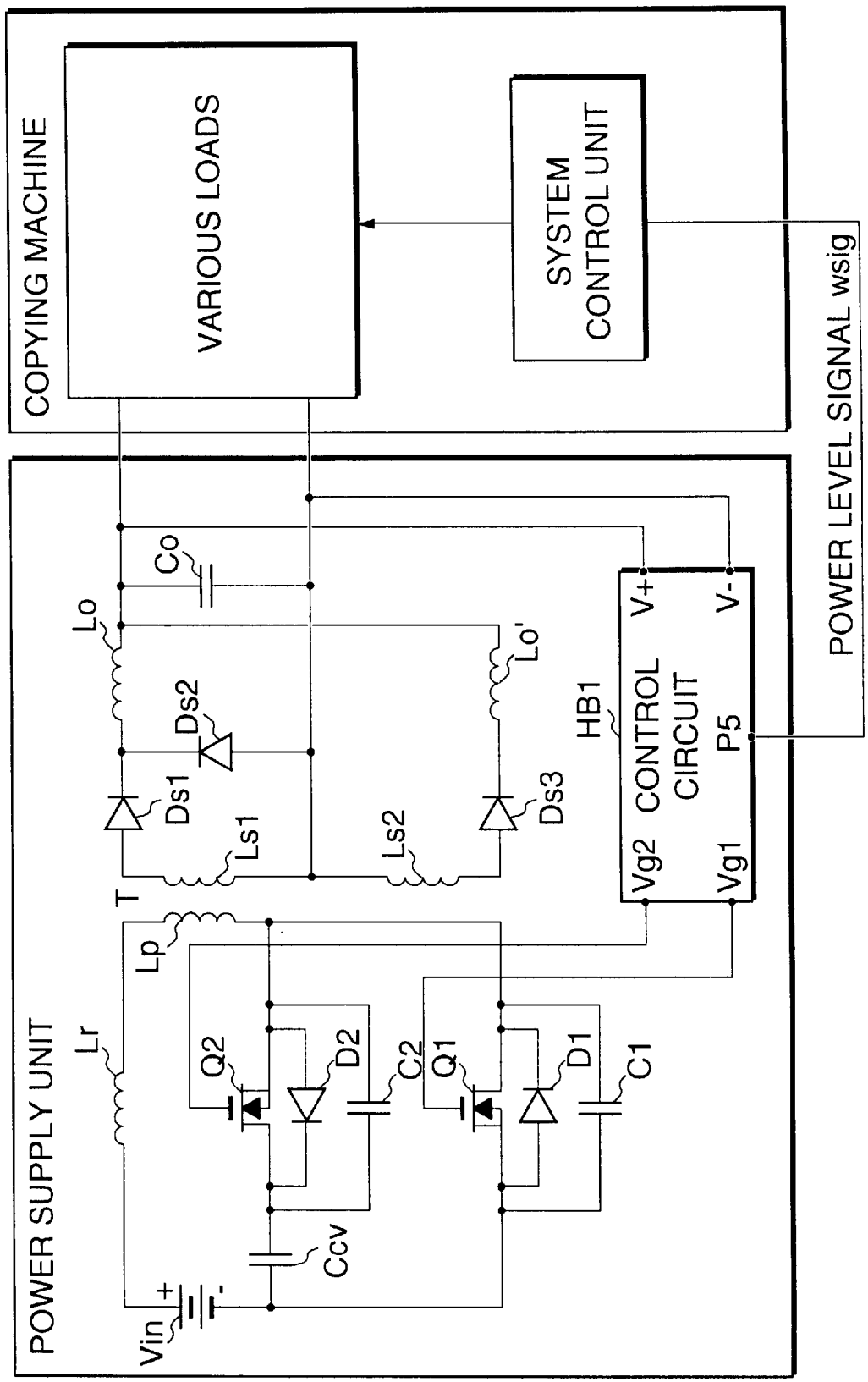
FIG. 1 is a schematic block diagram schematically showing the circuit configuration of a switching power supply unit according to an embodiment of the present invention is applied.

FIG. 1 is a schematic circuit diagram showing the arrangement of a switching power supply unit according to an embodiment of the present invention. The switching power supply unit according to the present embodiment has a switching power supply unit comprised of a partial resonance type forward converter.

In FIG. 1, a resonance inductor Lr, a primary winding Lp of an insulating transformer T, and a main switching device Q1 (N channel type MOS-FET in this embodiment) are connected to a direct-current power supply Vin that is comprised of a waveform shaping smoothing circuit connected to an alternating-current power supply.

A diode D1 and a capacitor C1 are equivalently connected to the main switching device Q1. Specifically, the diode D1 is included in the main switching device Q1, and is connected in anti-parallel between the source and drain of the main switching device Q1. The capacitor 1 is a parasitic capacitance between the drain and source of the main switching device Q1, but an external capacitor may be used as the capacitor C1.

A clamping capacitor Ccv is connected in parallel with the main switching device Q1 via an auxiliary switching device Q2 (N channel type MOS-FET in this embodiment). The capacitance of the clamp capacitor Ccv is larger than that of the capacitor C1 connected between both terminals of the main switching device Q1. As is the case with the main switching device Q1, the auxiliary switching device Q2 includes a diode D2 and a capacitor C2.

A secondary winding Ls1 of the insulating transformer T is connected to an output terminal via a smoothing circuit that is comprised of a waveform rectifier diode Ds1, a flywheel diode Ds2, a choke coil Lo, and a smoothing capacitor Co.

A tertiary winding Ls2 is a winding that transmits energy to the output side while the main switching device Q1 is OFF. The tertiary winding Ls2 is wound in the same direction as the secondary winding Ls1, and the trailing end of the secondary winding Ls1 and the leading end of the tertiary winding Ls2 are connected to each other and connected to the negative side of the output. The trailing end of the tertiary winding Ls2 is connected to a choke coil Lo' via a diode Ds3. Current flows through the tertiary winding Ls2 so that current can continuously flow through the choke coil Lo'. Thus, the current flowing through the tertiary winding Ls2 varies according to the amount of outputted current such that it increases in a heavy load state and decreases in a light load state. Likewise, the amount of current flowing through the primary winding Lp is proportional to the amount of current flowing through the tertiary winding Ls2, and thus the current returning to the input side increases in a heavy load state and decreases in a light load state.

Figure 2:
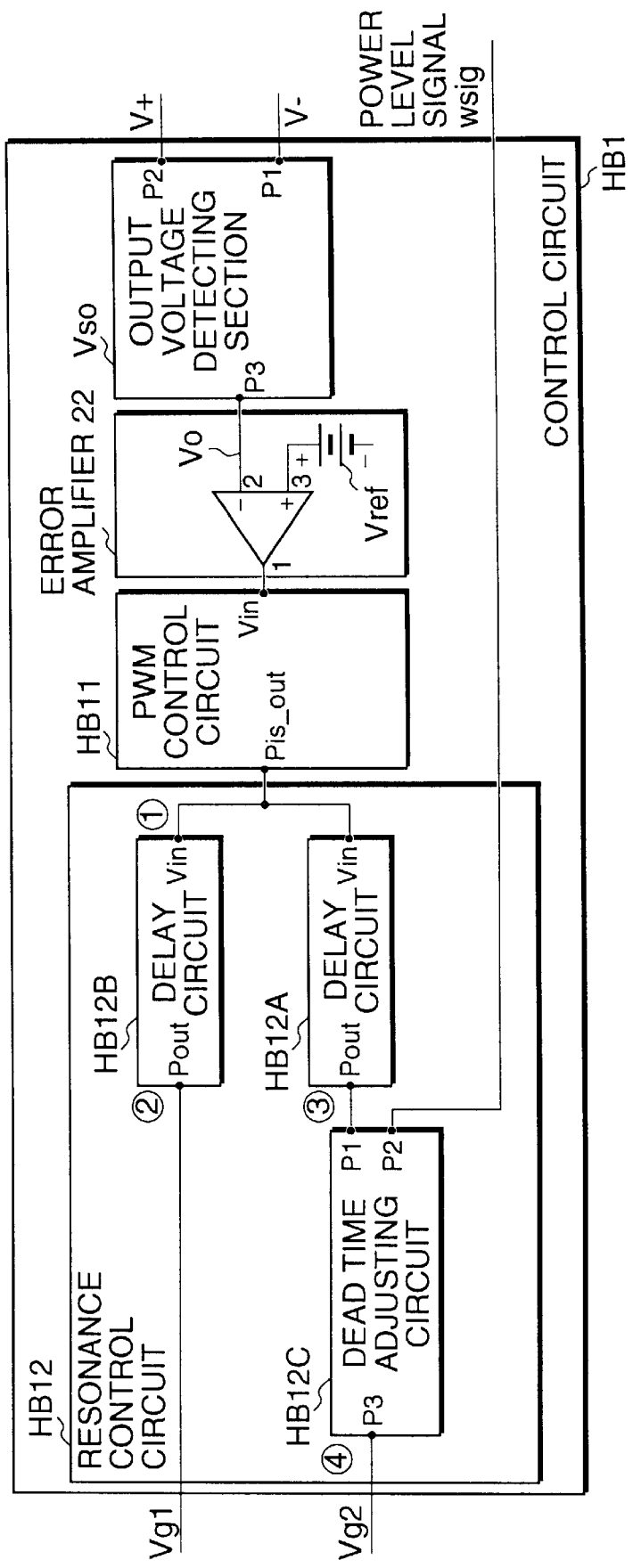
FIG. 2 is a block diagram showing the configuration of a control circuit HB1 in FIG. 1.
Figure 4A:
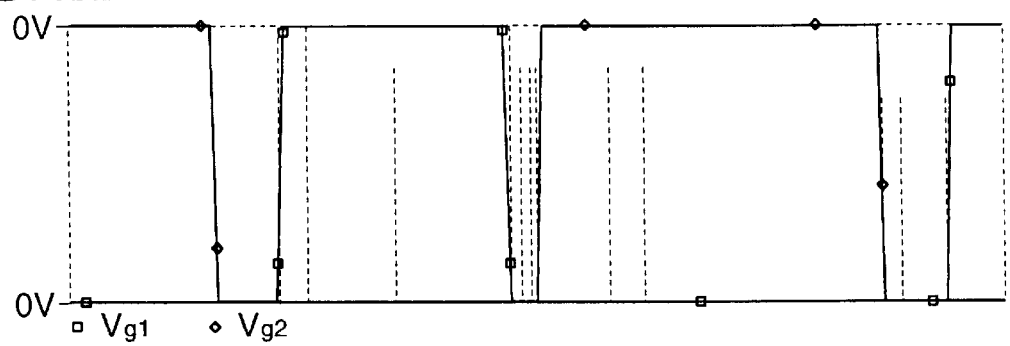
FIG. 4 is a diagram showing operational waveforms of various sections of the switching power supply unit of FIG. 1 in a light load state.
Figure 4B:
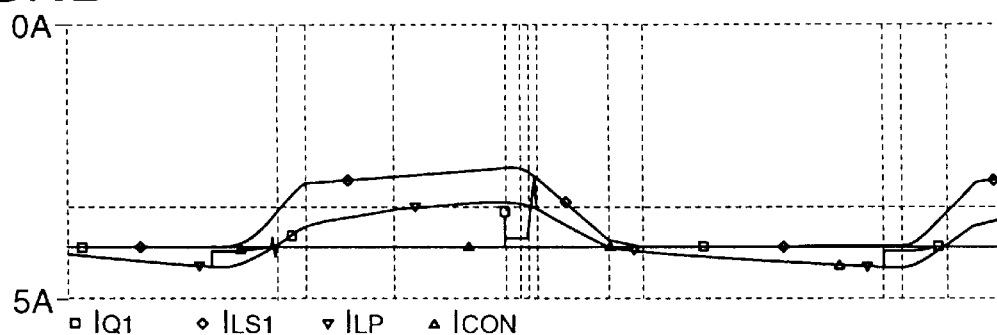
Figure 4C:
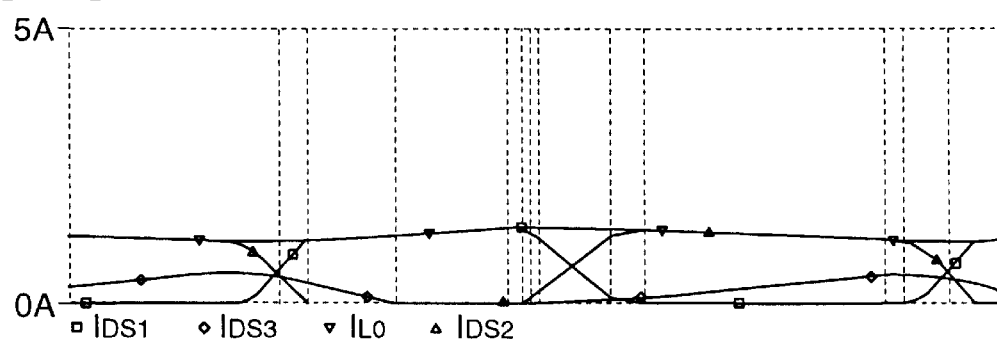
Figure 4D:
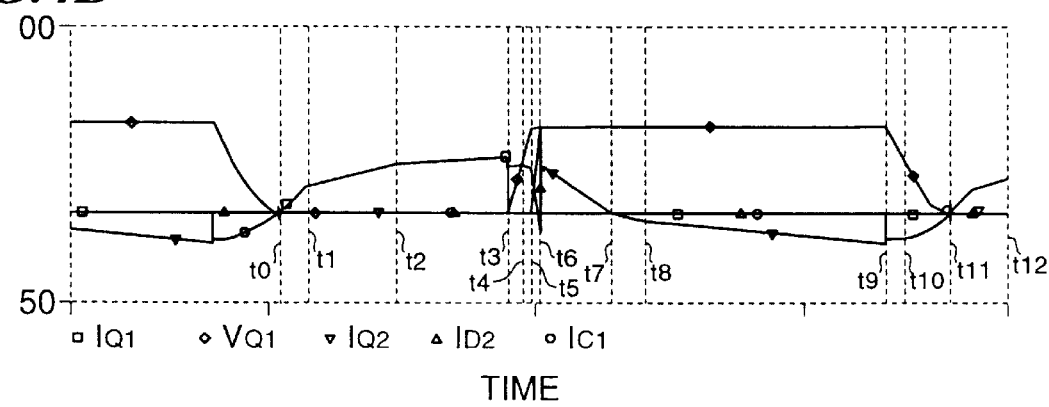
Figure 5A:
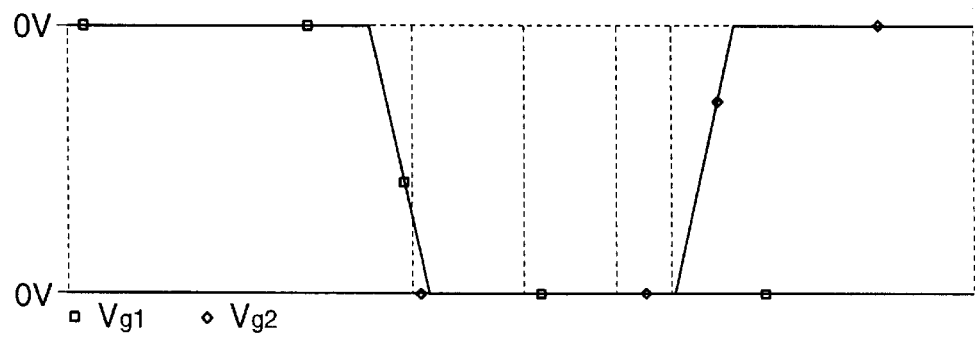
FIG. 5 is a partially enlarged diagram showing the operational waveforms in FIG. 4.
Figure 5B:
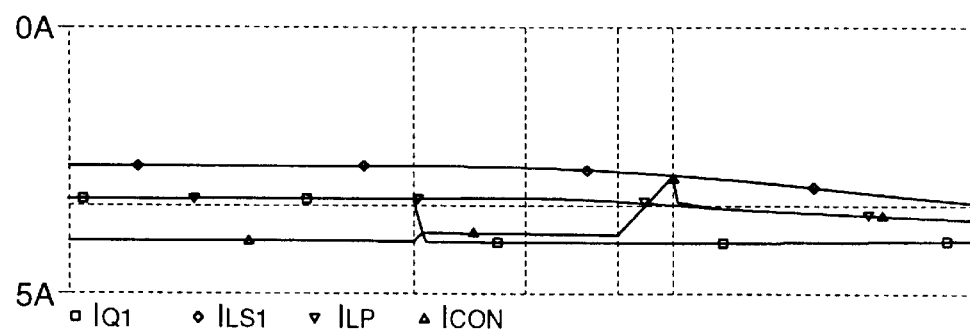
Figure 5C:
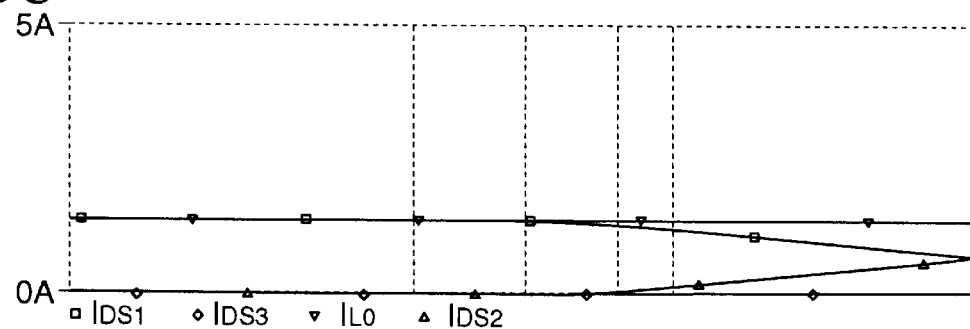
Figure 5D:
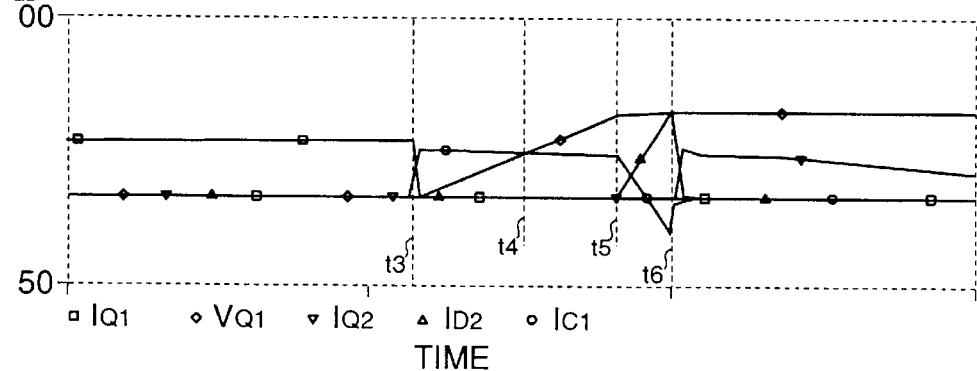
Figure 6A:
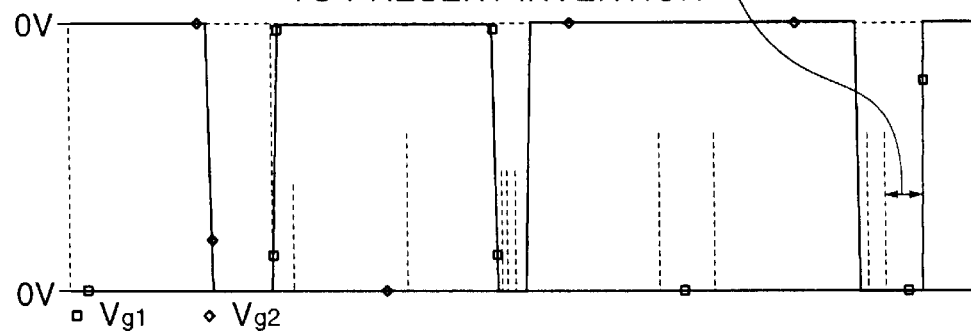
FIG. 6 is a diagram showing operational waveforms of various sections of the switching power supply unit of FIG. 1 in a heavy load state.
Figure 6B:
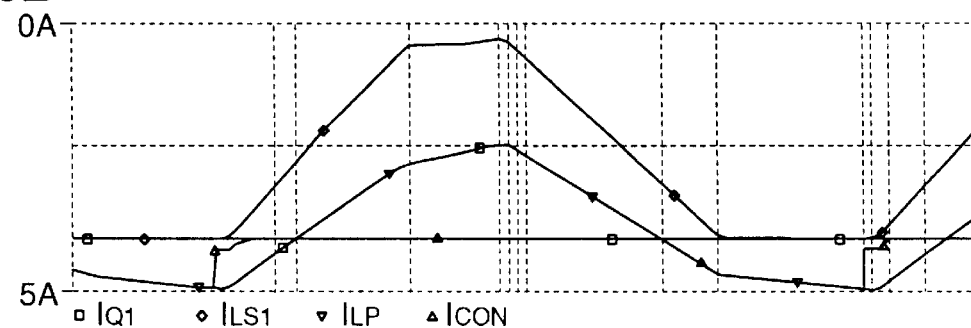
Figure 6C:
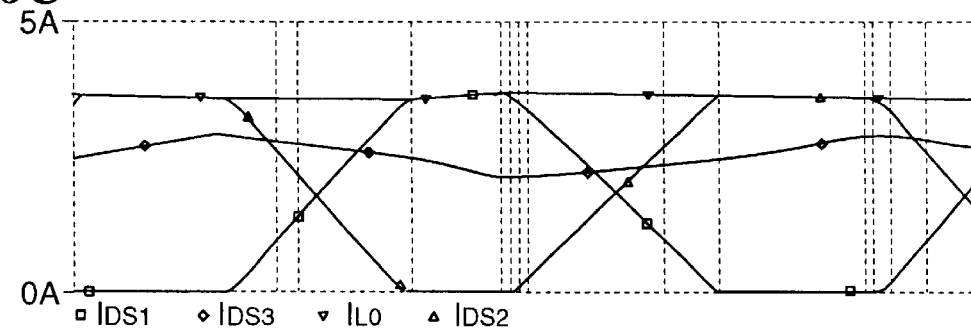
Figure 6D:
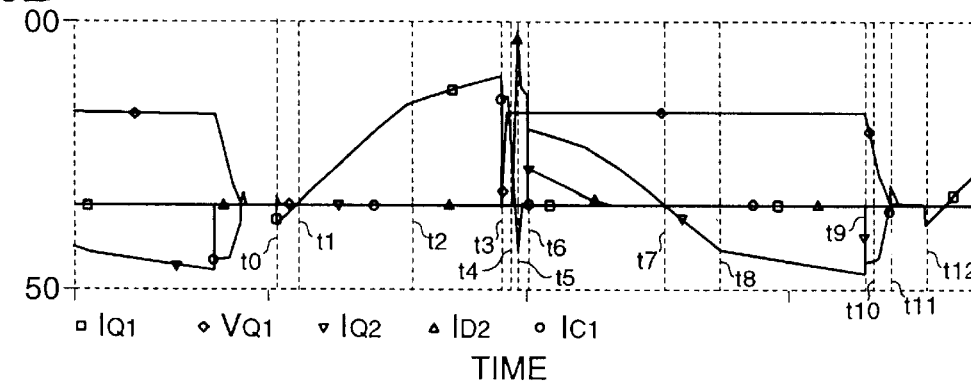
Figure 7A:
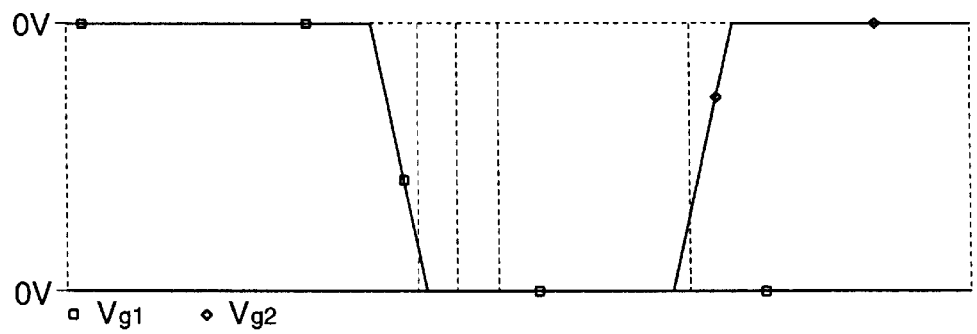
FIG. 7 is a partially enlarged diagram showing the operational waveforms in FIG. 6.
Figure 7B:
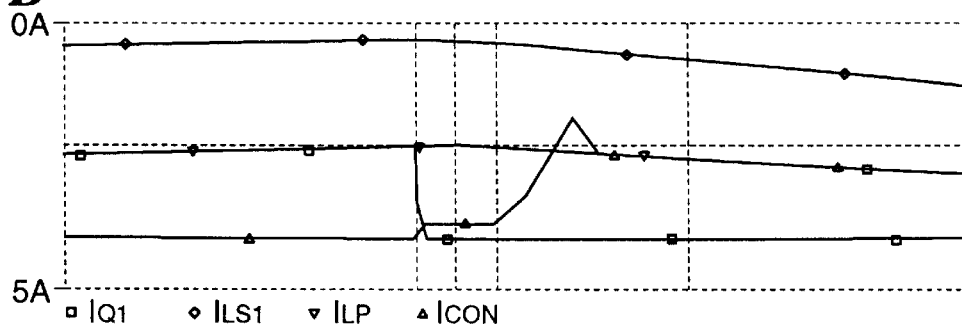
Figure 7C:
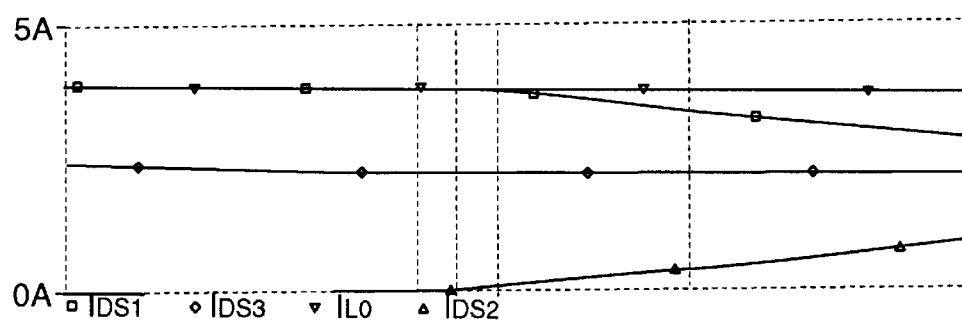
Figure 7D:
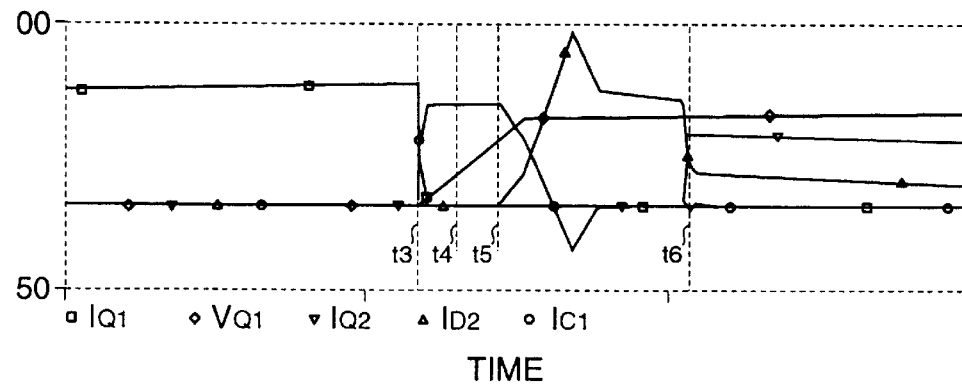
Figure 8A:
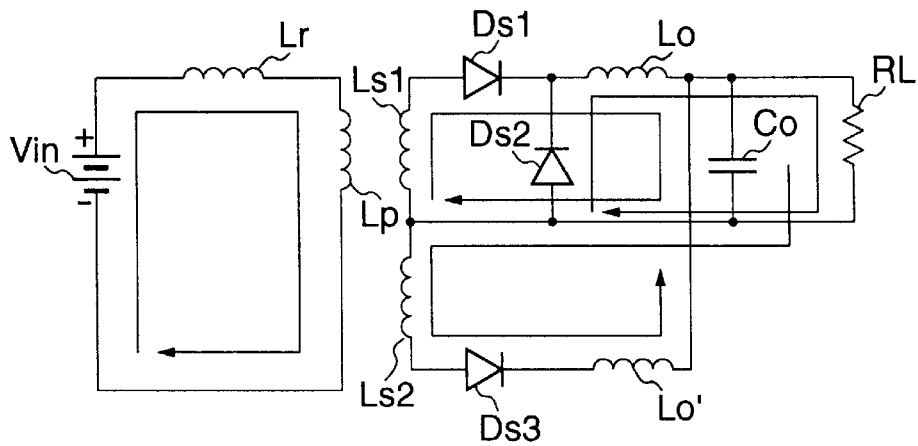
FIG. 8A is a circuit diagram showing an equivalent circuit of the switching power supply unit in FIG. 1 in a period of time t0–t1 shown in FIGS. 4–7.
Figure 8B:
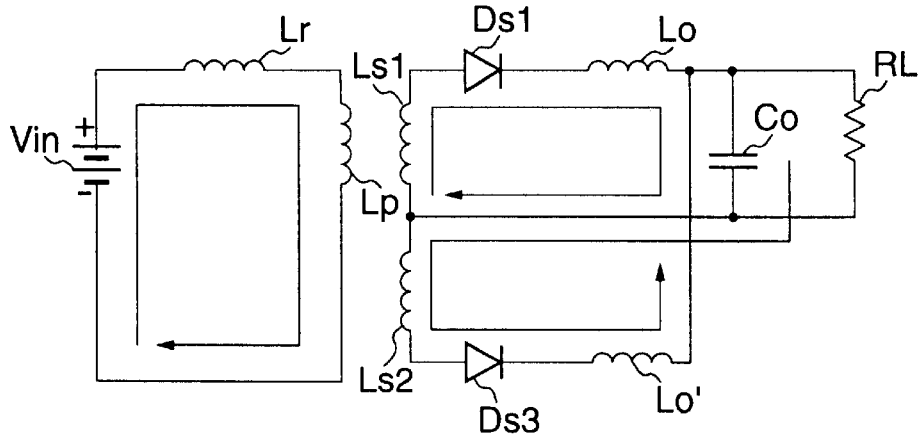
FIG. 8B is a circuit diagram showing an equivalent circuit of the switching power supply unit in FIG. 1 in a period of time t1–t2 shown in FIGS. 4 to 7.
Figure 8C:
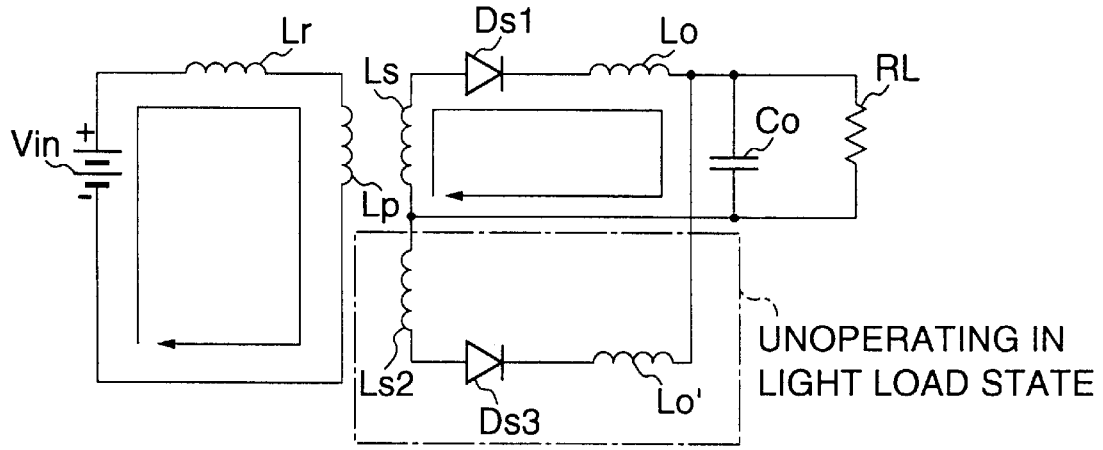
FIG. 8C is a circuit diagram showing an equivalent circuit of the switching power supply unit in FIG. 1 in a period of time t2–t3 shown in FIGS. 4–7.
Figure 9A:
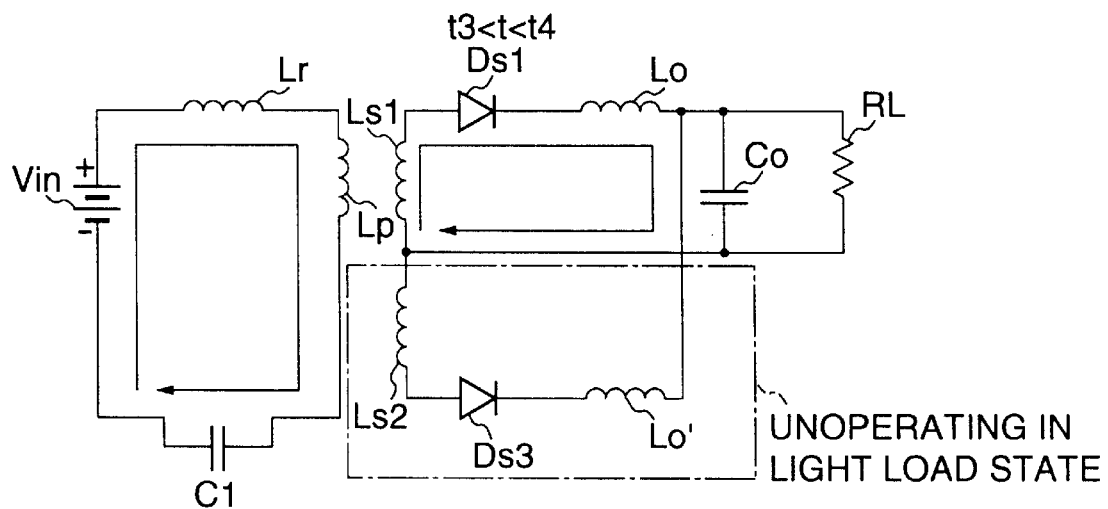
FIG. 9A is a circuit diagram showing an equivalent circuit of the switching power supply unit in FIG. 1 in a period of time t3–t4 shown in FIGS. 4–7.
Figure 9B:
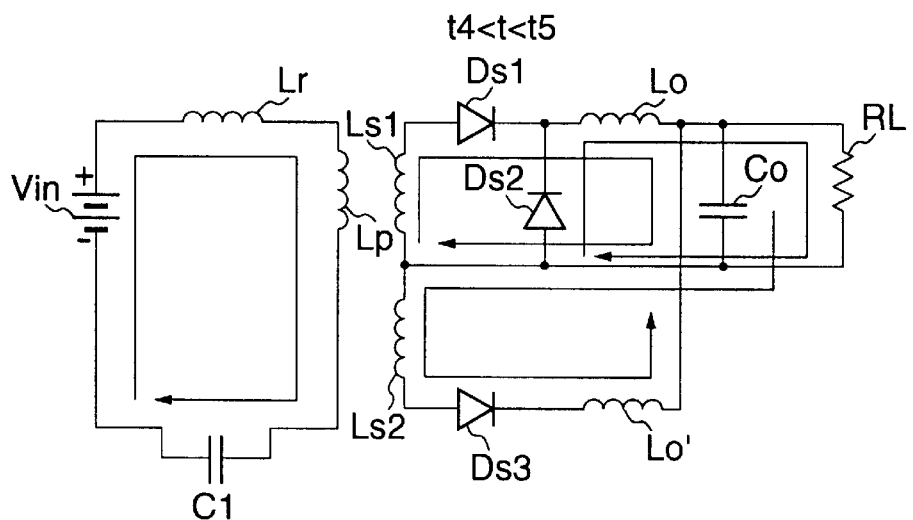
FIG. 9B is a circuit diagram showing an equivalent circuit of the switching power supply unit in FIG. 1 in a period of time t4–t5 shown in FIG. 4–FIG. 7.
Figure 9C:
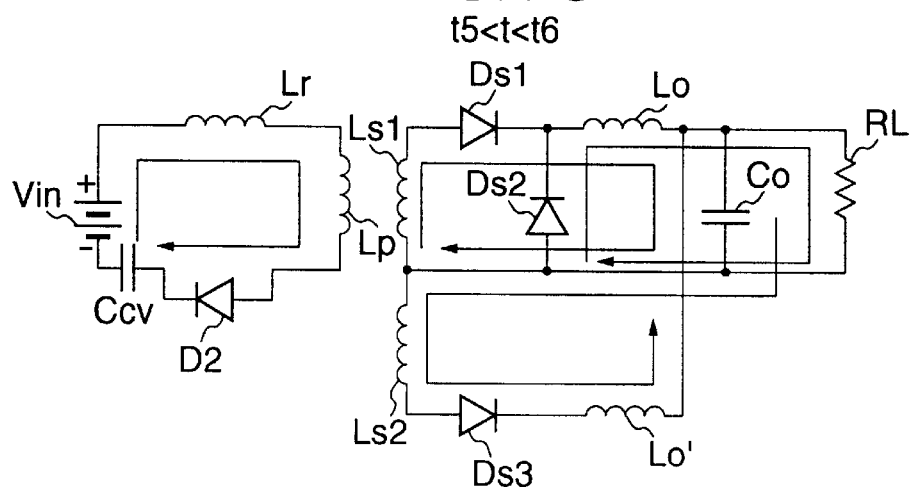
FIG. 9C is a circuit diagram showing an equivalent circuit of the switching power supply unit in FIG. 1 in a period of time t5–t6 shown in FIGS. 4–7.
Figure 10A:
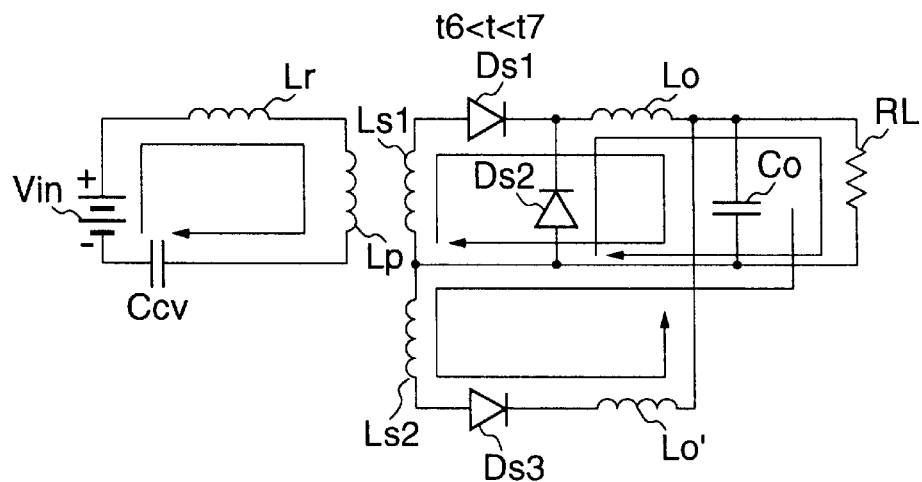
FIG. 10A is a circuit diagram showing an equivalent circuit of the switching power supply unit in FIG. 1 in a period of time t6–t7 shown in FIGS. 4–7.
Figure 10B:
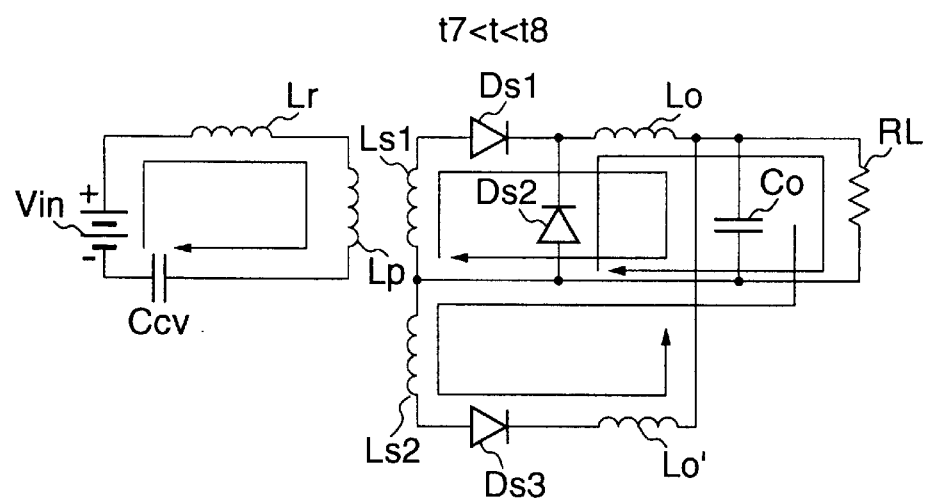
FIG. 10B is a circuit diagram showing an equivalent circuit of the switching power supply unit in FIG. 1 in a period of time t7–t8 shown in FIGS. 4–7.
Figure 10C:
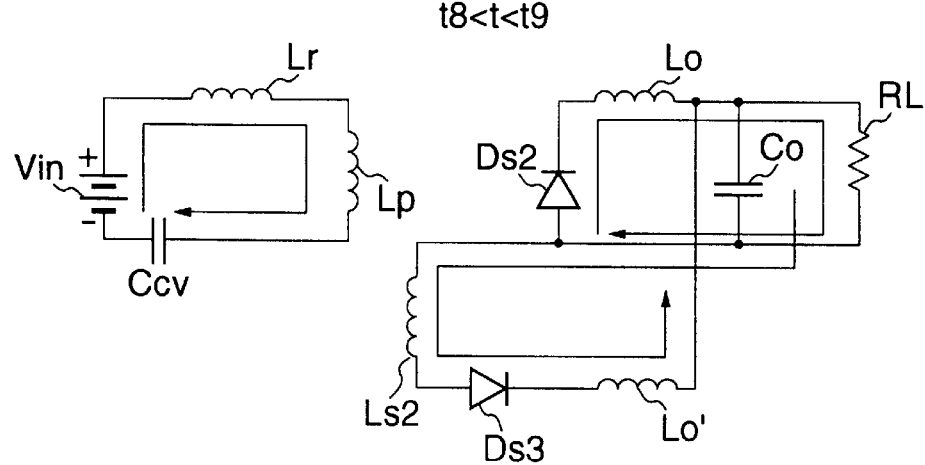
FIG. 10C is a circuit diagram showing an equivalent circuit of the switching power supply unit in FIG. 1 in a period of time t8–t9 shown in FIGS. 4–7.
Figure 11A:
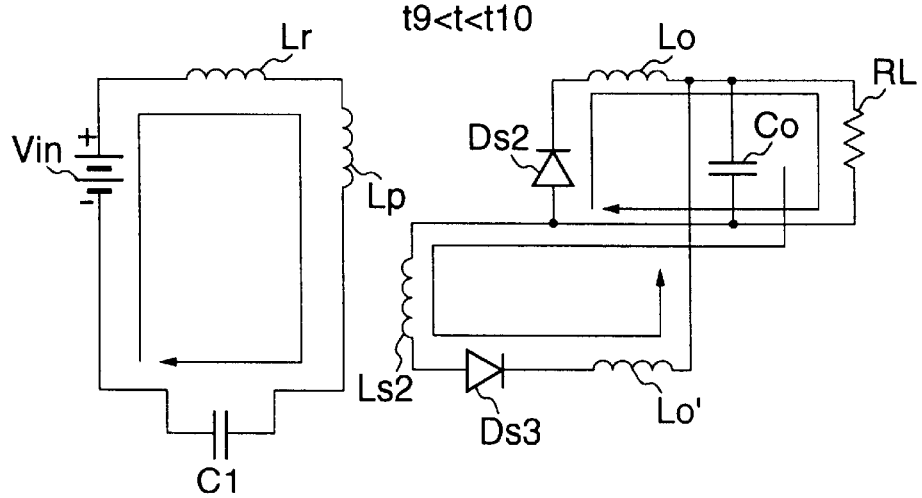
FIG. 11A is a circuit diagram showing an equivalent circuit of the switching power supply unit in FIG. 1 in a period of time t9–t10 shown in FIGS. 4–7.
Figure 11B:
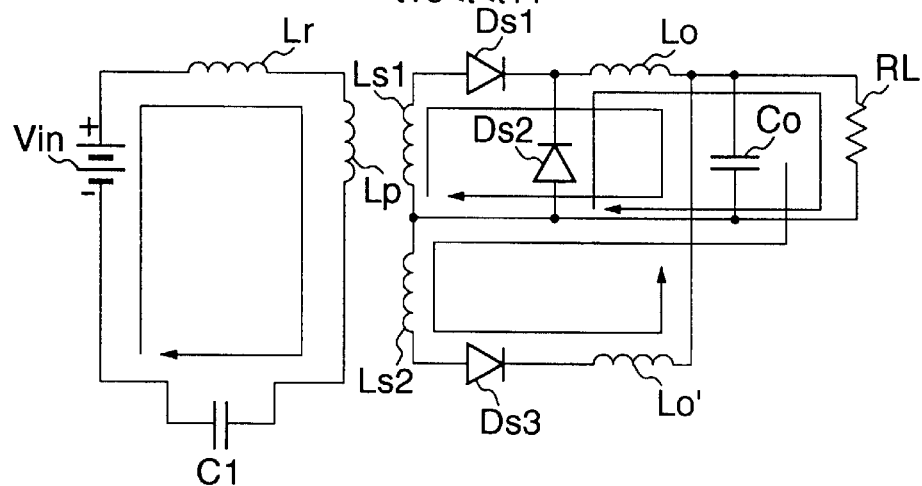
FIG. 11B is a circuit diagram showing an equivalent circuit of the switching power supply unit in FIG. 1 in a period of time t10–t11 shown in FIGS. 4–7.
Figure 11C:
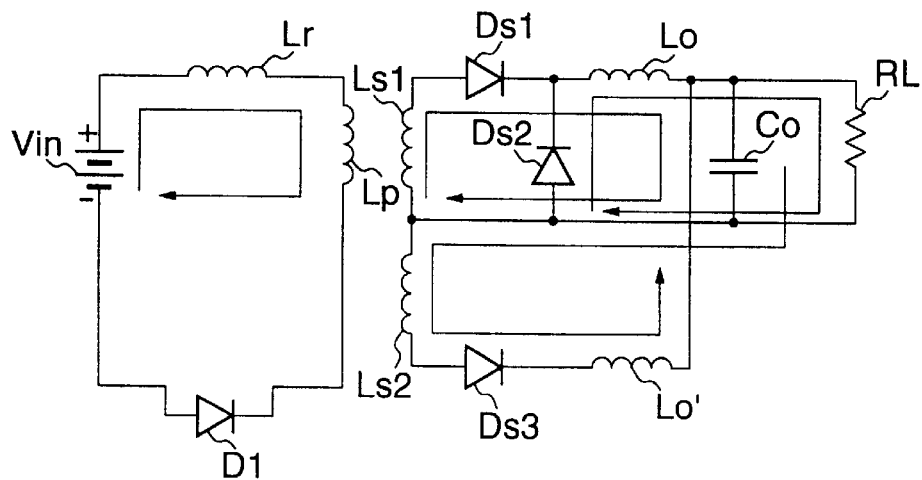
FIG. 11C is a circuit diagram showing an equivalent circuit of the switching power supply unit in FIG. 1 in a period of time t11–t12 shown in FIGS. 4–7.
Figure 12:
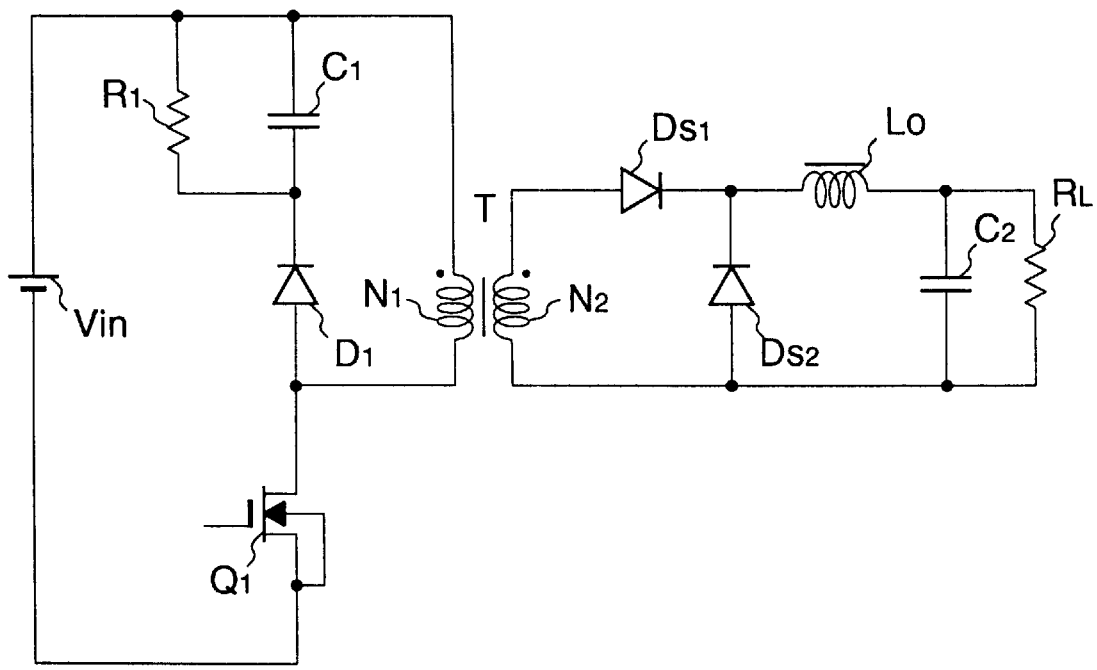
FIG. 12 is a circuit diagram showing the circuit configuration of a conventional forward converter.
Figure 13A:
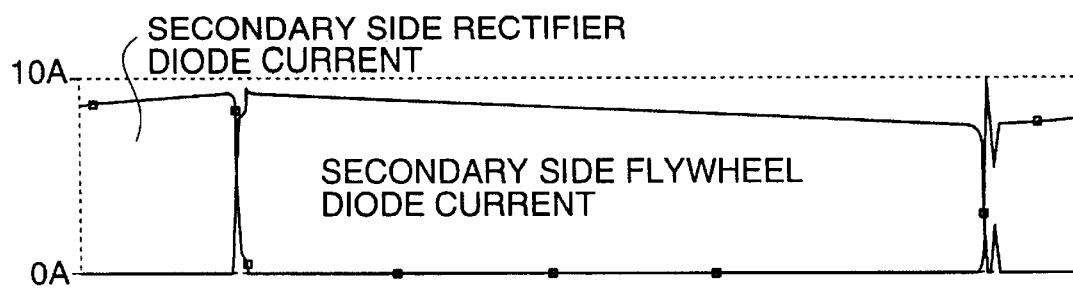
FIG. 13A through FIG. 13D are diagrams showing operational waveforms of the conventional forward converter.
Figure 13B:
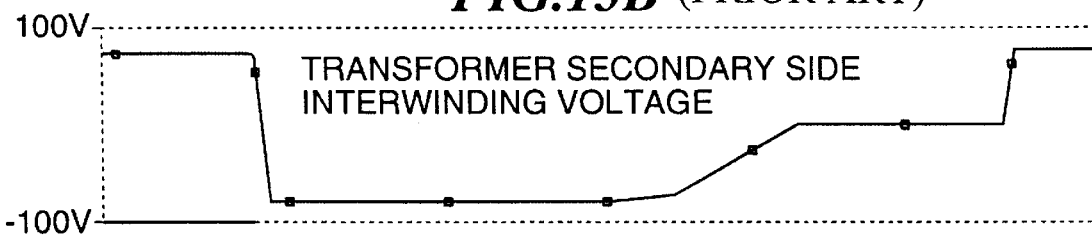
Figure 13C:
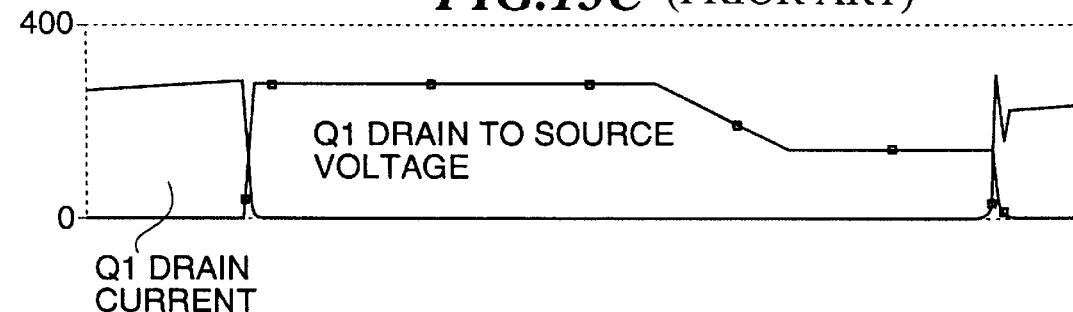
Figure 13D:
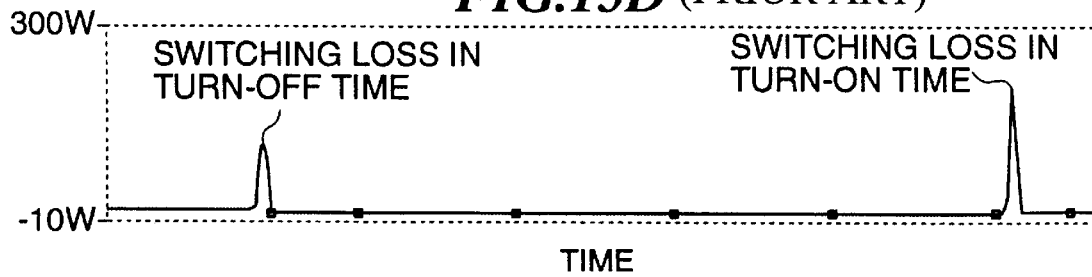
Figure 14A:
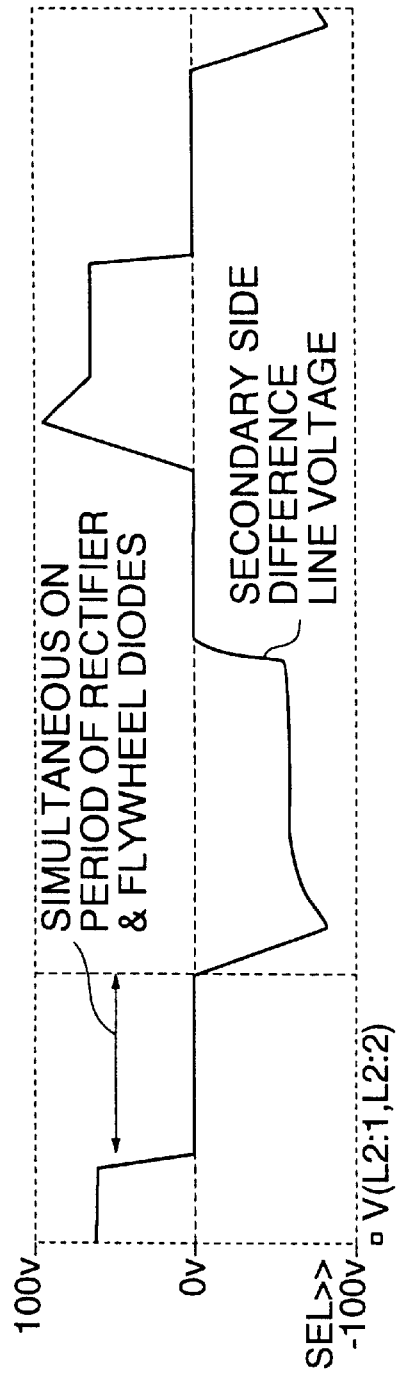
FIG. 14 is a diagram showing operational waveforms of a conventional partial resonance type forward converter.
Figure 14B:
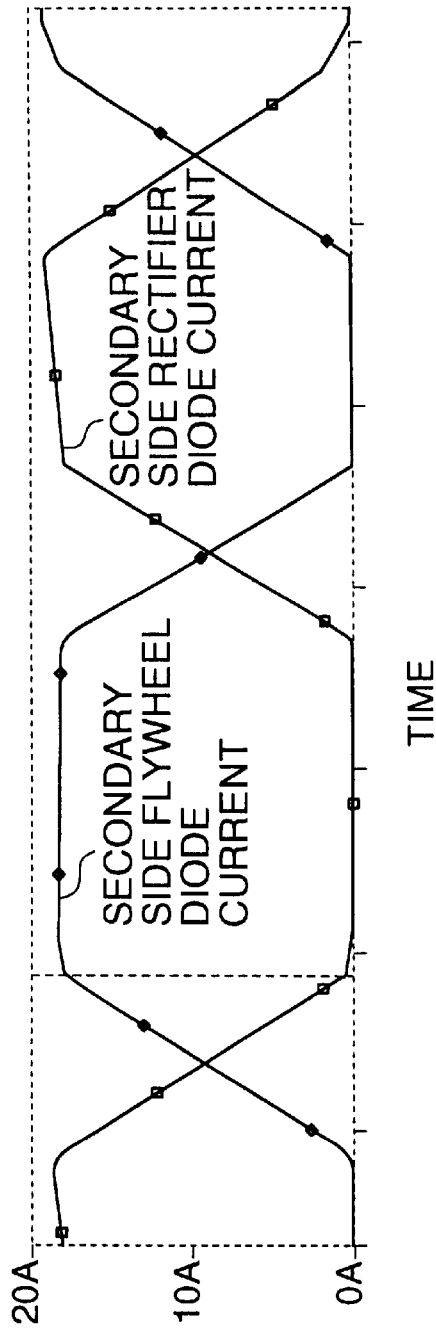

FIG. 2 is a block diagram showing the configuration of a control circuit HB1 in FIG. 1. As shown in FIG. 2, a control circuit HB1 for turning on/off the switching devices Q1, Q2 is comprised of a PWM control circuit HB11 that adjusts the ON period of the main switching device Q1 according to an output voltage, and a resonance control circuit HB 12 that has delay circuits for delaying output signals from the PWM control circuit HB22 by a dead time, and adjusts timing in which the terminal voltage across the main switching device Q1 becomes zero due to resonance.

The PWM control circuit HB11 for turning on/off the main switching device Q1 determines an on-duty in a manner described below. First, an output voltage detecting section Vso detects a voltage between output terminals P1 and P2, and the detected output voltage Vo is inputted to one input terminal of an error amplifier 22. The other input terminal of the error amplifier 22 is connected to a reference voltage Vref. The output voltage Vo is compared with the reference voltage Vref and an output signal indicative of the difference between the output voltage Vo and the reference voltage Vref from the error amplifier 22 is inputted to the PWM control circuit HB11. The PWM control circuit HB11 compares the output signal from the error amplifier 22 with a triangular wave generated by a triangular wave generator OSC (not illustrated) having a predetermined repetition period to generate a drive pulse whose ON period corresponds to the output voltage Vo, thus providing a feedback control to drive the main switching device Q1. In this embodiment, a general purpose PWM control IC having a dead time control (DTC) terminal is used as the PWM control circuit HB11 so that a DTC terminal voltage can specify the maximum duty ratio.

A description will now be given of the operation of the resonance control circuit HB12.

The resonance control circuit HB12 receives an output signal from the PWM control circuit HB11 so as to generate an ON period during which each of the switching devices Q1, Q2 is to be off according to the on-off timing of the main switching device Q1 determined by the PWM control circuit HB11. According to the received signal, a dead time with respect to the turning-on/off of the main switching device Q1 is determined by a delay circuit HB12A that determines a delay time from the turning-off of the auxiliary switching device Q2 to the turning-on of the main switching device Q1 and a delay circuit HB12B that determines a delay time from the turning-off of the main switching device Q1 to the turning-on of the auxiliary switching device Q2, so that the zero-voltage switching is carried out. An initial value of the dead time determined by the delay circuit HB12A is set to the maximum value according to the discharge period in a light load state, and a dead time adjusting circuit HB12C is connected to the delay circuit HB12A so as to adjust the range of the dead time according to the load conditions.

Waveforms indicated by ①–④ in FIG. 3 represent voltage waveforms at respective points ①–④ in FIG. 2. The PWM control circuit HB11 generates a pulse output as indicated by ① in FIG. 3 at a duty ratio or repetition period T. The duty ratio is adjusted so that the pulse width can be reduced as indicated by broken lines when the output voltage exceeds the reference value and the pulse width can be increased when the output voltage becomes lower than the reference value. This is the same operation as what is carried out by a conventional PWM controlled switching regulator.

The resonance control circuit HB12 receives the pulse signal ① in FIG. 3, and the delay circuit HB12A acquires a pulse signal ③ in FIG. 3, which is the logical product of the pulse signal ① and an output signal obtained by inputting the pulse signal ① to a CR integrating circuit in order to generate a delay signal for delaying the turning-ON period of the auxiliary switching device Q2. Likewise, the delay circuit HB12B acquires the pulse signal ② in FIG. 3, which is the logical product of a signal inverted from the pulse signal ① in FIG. 3 and an output signal obtained by inputting the inverted signal to a CR integrating circuit in order to generate a delay signal for delaying the turning-ON period of the auxiliary switching device Q2. Further, the dead time adjusting circuit HB12C receives the output signal from the delay circuit HB12A, and generates a dead time according to a signal outputted from a system control software of a copying machine as indicated by ③ in FIG. 3. A high level signal is inputted to the dead time adjusting circuit HB12C when the driving power of the copying machine is large and a low level signal is inputted to the dead time adjusting circuit HB12C when the driving power of the copying machine is small, so that the dead time adjusting circuit HB12C can adjust the dead time according to the load conditions.

Referring next to FIG. 4 through FIG. 7, there will be described the operation of the switching power supply unit in FIG. 1. These figures show operational waveforms in the case where there is not provided the dead time adjusting circuit HB12C according to the present embodiment, but the switching power supply unit has the same basic operation irrespective of whether there is provided the dead time adjusting circuit.

The waveforms in FIG. 4 represent the state of each section in FIG. 1 in a light load state, and the waveforms in FIG. 6 represent the state of each section in FIG. 1 in a heavy load state.

The operation of the switching power supply unit in FIG. 1 can be described by referring to divided time sections t0 to t12, although the apparatus operates in slightly different manners between a light load state and a heady load state as shown in FIG. 4 and FIG. 6. FIG. 8A through FIG. 11C show equivalent circuits in the respective time sections. In the following description, a prefix I indicates current, and for example, ILP indicates current flowing through the primary winding Lp.

$$t0-t1 \tag{1}$$

Conditions: Ilp(t0)=0, IDs2(t1)=0

In this time section, the main switching device Q1 is in the ON state according to the drive pulse signal, and the auxiliary switching device Q2 is in the OFF state. On this occasion, the rectifier diode Ds1 and the flywheel diode Ds2 on the secondary side are in the ON state, and the tertiary winding Ls2 of the transformer T forms a closed circuit together with the diode Ds3, the choke coil Lo' and the capacitor Co. A leakage inductance of the tertiary winding Ls2 or an external inductance (choke coil Lo') causes current flowing through the diode Ds3 so that current flows into the leading end of the tertiary winding Ls3 due to its inertia.

Current ILP flowing through the primary winding Lp is determined by the inductance of the resonance inductor Lr, a leakage inductance Lp1 of the primary winding Lp of the transformer T, and current flowing through the tertiary winding Ls2.

$$t1-t2 \tag{2}$$

Conditions: IDS2(t1)=0, IDs3(t2)=0

In this time section, current flowing through the rectifier diode Ds1 becomes equal to current flowing through the smoothing coil Lo to turn off the flywheel diode Ds2. The current conducting period of the diode Ds3 varies according to the load current, and at a time point t2, current IDs3 flowing through the diode Ds3 becomes equal to "0".

In this time section, current outputted to the load from the secondary winding Ls1 is equal to the sum of current that is found from current flowing through the primary winding Lp (i.e. current flowing into the leading end of the winding) according to the number of turns, and current flowing into the leading end of the tertiary winding Ls2.

$$t2-t3 \tag{3}$$

Conditions: IDs3(t2)=0, t3:Q1=OFF

A state in this time section is the same as that in the conventional forward converter. The value of current flowing through the primary winding Lp is proportional to the value of current flowing through the choke coil Lo and the capacitor Co from the secondary winding Ls2 via the rectifier diode Ds1.

$$t3-t4 \tag{4}$$

Conditions: t3:Q1=OFF, Vds(t4)=Vin

When the main switching device Q1 is turned off, current that has been flowing through the primary winding Lp continues flowing due to its inertia to start charging the capacitor C1 connected in parallel therewith.

Since the capacitor C1 is also connected in parallel with the resonance inductor Lr and the primary winding Lp of the transformer T, the resonance inductor Lr and the primary winding Lp are brought into a state of resonance to raise a voltage across the capacitor C1, i.e. a terminal voltage Vds of the main switching device Q1 between the drain and source thereof from zero into a sine wave. In this case, the value of current flowing through the main switching device Q1 is zero, and the terminal voltage of the main switching device Q1 rises from zero. Therefore, changes in current and voltage overlap with each other when the switching device Q is turned off. This prevents energy loss.

$$t4–5 \tag{5}$$

Conditions: Vds(t4)=Vin, Vds(t5)=VccV

At the time point t3, the charging of the capacitor C1 is started, as noted above. When the voltage at the capacitor C1 becomes equal to the input voltage Vin, the voltage applied to the primary winding Lp of the transformer T lowers to zero so that the secondary flywheel diodes Ds2 and Ds3 are brought into conduction. On this occasion, the rectifier diode Ds1 remains conducting to cause the secondary winding Ls1 to be short-circuited.

Further, on this occasion, residual energy in the coils on the primary side (e.g. the inductance of the resonance inductor Lr and the leakage inductance of the primary winding Lp) is continuously charged into the capacitor C1. Since the secondary winding Ls1 of the transformer T is short-circuited, the capacitor C1 and the resonance inductor Lr are brought into a state of resonance, so that the capacitor C1 is continuously charged until the voltage at the capacitor C1 reaches a terminal voltage Vccv across the clamp capacitor Ccv.

$$t5–t6 \tag{6}$$

Conditions: Vds(t5)=Vccv, t6:Q2=ON

Immediately after the time point t5, the voltage of current charged in the capacitor C1 becomes higher than the voltage at the clamp capacitor Ccv, so that the diode D2 is brought into conduction to start charging the clamp capacitor Ccv. On this occasion, the capacitance of the clamp capacitor Ccv has a substantially larger value than that of the capacitor C1, so that the voltage of current charged in the capacitor C1, i.e. the terminal voltage Vds across the main switching device Q1 is clamped at a substantially constant voltage.

$$t6–t7 \tag{7}$$

Conditions t6:Q2=ON, ILp(t7)=0

At the time point t6, the auxiliary switching device Q2 shifts into the ON state, so that the diode Ds2 is brought into the OFF state.

On this occasion, residual energy in the coils on the primary side is continuously charged into the clamp capacitor Ccv via the auxiliary switching device Q2. At a time point t7, the energy accumulated in the coils is completely transferred to the clamp capacitor Ccv so that the current flowing through the primary winding Lp is reduced to zero.

$$t7–t8 \tag{8}$$

Conditions: ILp (t7)=0, IDs1(t8)=0

When at the time point t7, all the energy accumulated in the coils on the primary side has been transferred to the clamp capacitor Ccv, the resonance of the clamp capacitor Ccv and the resonance inductor Lr starts regenerating the energy to the input side.

$$t8–t9 \tag{9}$$

Conditions: IDs1(t8)=0, t9:Q2=OFF

At the time point t8, the rectifier diode Ds1 comes into the OFF state, so that the supply of power from the tertiary winding Ls2 to the load is started. The amount of current regenerated to the input side on the primary side varies in proportion to the power supply level such that it increases as time passes until a time point t9 when the auxiliary switching device Q2 is turned off.

$$t9–t10 \tag{10}$$

Conditions: t9:Q2=OFF, Vds(t10)=Vin

When at the time point t9, the auxiliary switching device Q2 is turned off, the regenerated current that has been flowing on the primary side continues to flow to the input side due to the inertia of the resonance inductor Lr. Consequently, the energy accumulated in the capacitor C1 connected in parallel with the main switching device Q1 is drawn out to lower the voltage level of the capacitor C1.

On this occasion, the capacitor C1, the primary winding Lp and the resonance inductor Lr are connected in series to one another to form a resonance circuit.

The energy accumulated in the capacitor C1 is regenerated to the input side. When the terminal voltage across the capacitor C1 becomes equal to the input voltage, the rectifier diode connected to the secondary winding Ls2 of the transformer T starts conducting.

$$t10–t11 \tag{11}$$

Conditions: Vds(t10)=Vin, Vds(t11)=0

At the time point t10, the voltage of the capacitor C1, i.e. the terminal voltage Vds across the main switching device Q1 becomes equal to the input voltage Vin so that the rectifier diode Ds1 and the flywheel diode Ds2 are brought into conduction to short-circuit the transformer T. Then, the capacitor C1 and the resonance inductor Lr are brought into a state of resonance to continuously lower the terminal voltage Vds across the main switching device Q1. The electric current is discharged until the voltage Vds drops to zero.

$$t11–t12 \tag{12}$$

Conditions: Vds(t11)=0, t12:Q1=ON

This time section is a dead time period after the voltage of the capacitor C1 becomes zero due to the discharge thereof and until the main switching device Q1 is turned on. Due to this dead time period, the main switching device Q1 will be turned on with its the terminal voltage Vds being zero, thus preventing energy loss.

Conventionally, the dead time period was set to a period suitable for a light load state. This resulted in a time period that does not contribute to the transmission of power in a heady load state as shown in FIGS. 4–7. Therefore, the maximum ON period had to be limited, which led to a low output voltage and degraded voltage transmission efficiency in a heavy load state.

According to the present embodiment, in order to minimize the dead time period, the dead time adjusting circuit HB12C adjusts the dead time period by supplying a control signal corresponding to the electric power amount to the power supply unit according to the timing and electric power amount for driving the load upon an apparatus whose drive sequence is sequentially controlled by software. The dead time is increased as shown in FIGS. 4 and 5 if the power consumption of the apparatus is small and it is decreased if the power consumption is large so that the main switching device Q1 can be turned on at positions indicated by broken lines in FIGS. 6 and 7.

Therefore, the zero-voltage switching of the main switching device Q1 can be performed when it is turned on and off. Moreover, the maximum ON period is controlled to vary, which makes it possible to prevent a voltage drop in a heavy load state and the negative excitation of the transformer resulting from an excessive OFF period.

Although according to the present embodiment, a control signal for adjusting the dead time is provided from an apparatus in which the switching power supply unit is installed, the present invention is not limited to such an arrangement. The power supply unit itself can provide the optimum control if it is provided with a circuit that monitors the output power.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claims is:

1. A switching power supply unit comprising:
   a transformer having at least a primary side and a secondary side;
   a main switching device disposed on the primary side of said transformer;
   an auxiliary switching device disposed on the primary side of said transformer for controlling resonance so as to prevent power loss accompanying a switching action of said main switching device; and
   varying means for varying an OFF period, during which both said main switching device and said auxiliary switching device are OFF, according to power consumption by a load disposed on the secondary side of said transformer,
   wherein resonance is controlled to allow zero-voltage switching over the entire load region of the power supply.

2. A switching power supply unit according to claim 1, wherein said varying means increases the OFF period as power consumption by the load is smaller and decreases the OFF period as the power consumption by the load is larger.

3. A switching power supply unit of a PWM-controlled forward converter type comprising:
   an input power supply;
   a transformer having a primary winding connected in series to said input power supply, a secondary winding, and a tertiary winding;
   a resonance inductor connected in series to said input power supply;
   main and auxiliary switching devices of a field effect type;
   a rectifier diode connected to the secondary winding;
   a flywheel diode connected to the secondary winding;
   an inductor connected to the secondary winding;
   a first capacitor formed of a parasitic or independent capacitor connected in parallel between a drain and a source of said main switching device;
   a first diode connected in anti-parallel between the drain and source of said main switching device;
   a second capacitor connected in parallel with said main switching device via said auxiliary switching device, said second capacitor having a larger capacitance than said first capacitor;
   a third capacitor formed of a parasitic or independent capacitor connected in parallel between a drain and a source of said auxiliary switching device;
   a second diode connected in anti-parallel between the drain and source of said auxiliary switching device;
   a third diode connected to said tertiary winding;
   a PWM control circuit that generates a first control signal for turning on/off said main switching device, and a second control signal for turning on/off said auxiliary switching device so as to give a predetermined dead time to an ON-OFF period of the first control signal; and
   a control circuit that varies timing of the second control signal according to a power consumption level of a load on an apparatus in which the switching power supply unit is installed;
   wherein said tertiary winding has one end thereof connected to the secondary winding such that said tertiary winding is identical in magnetic polarity with said secondary winding, and said tertiary winding has another end thereof connected to said third diode such that excitation energy accumulated in said transformer is outputted to a positive pole of an output side of the switching power supply unit while allowing adjustment of regenerated current at an input side of the switching power supply unit when said main switching device is turned off.

* * * * *